Aug. 31, 1926. 1,598,346
S. S. GUY
LUBRICATION OF MOTOR VEHICLES
Filed June 16, 1923 2 Sheets-Sheet 1
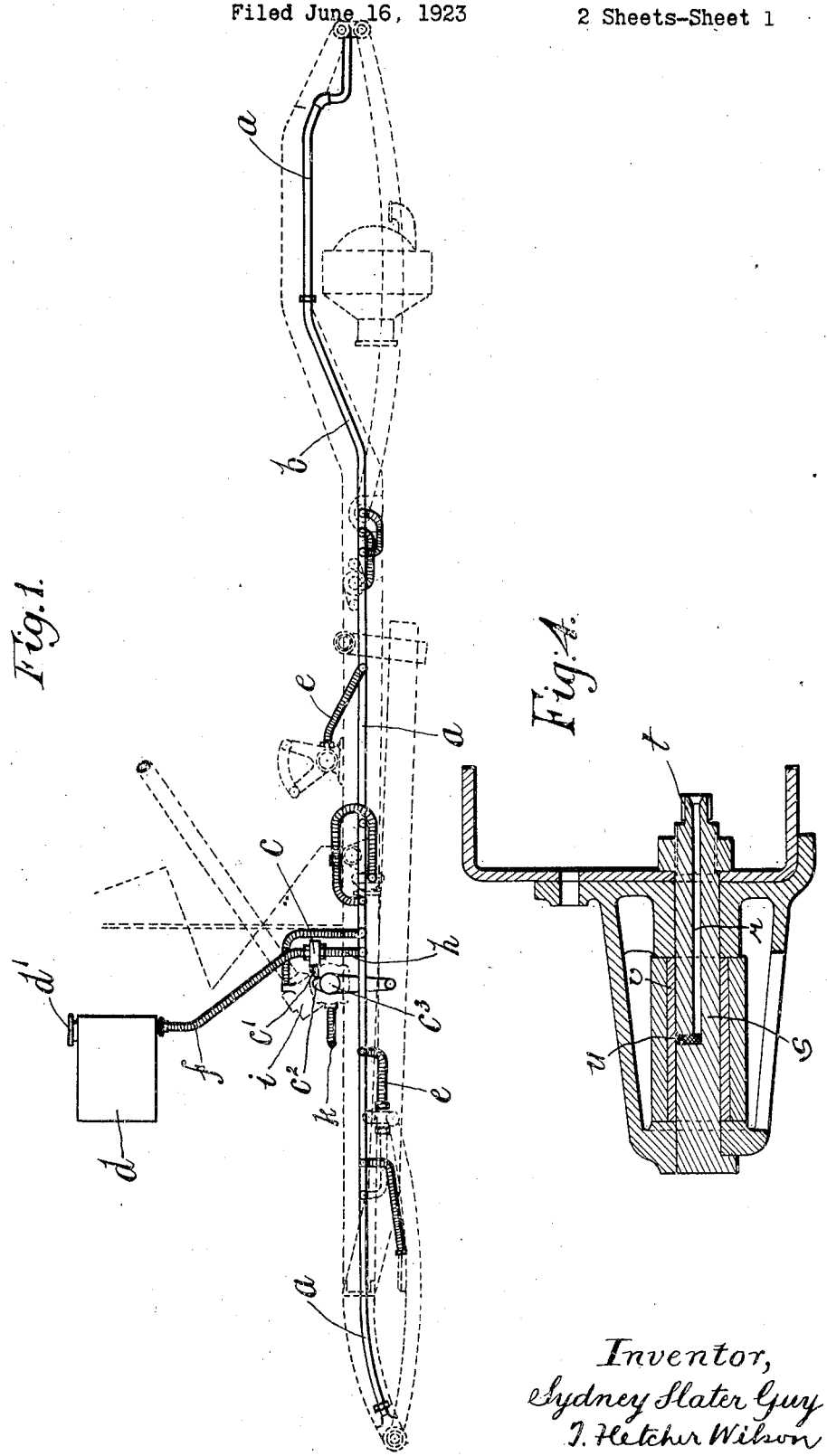
Inventor,
Sydney Slater Guy
J. Fletcher Wilson
Attorney.

Aug. 31, 1926.
S. S. GUY
1,598,346
LUBRICATION OF MOTOR VEHICLES
Filed June 16, 1923
2 Sheets-Sheet 2
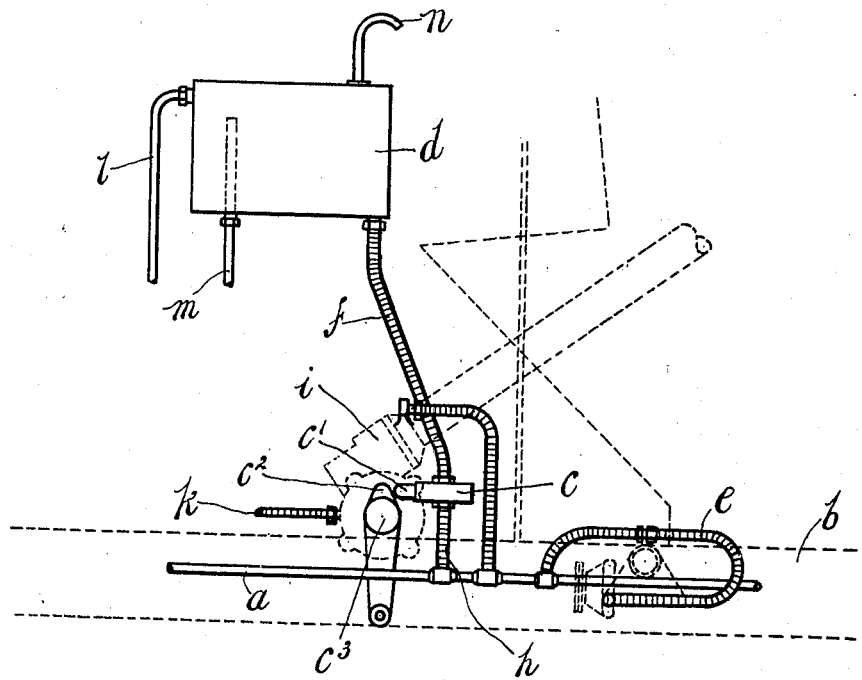
Fig: 2.
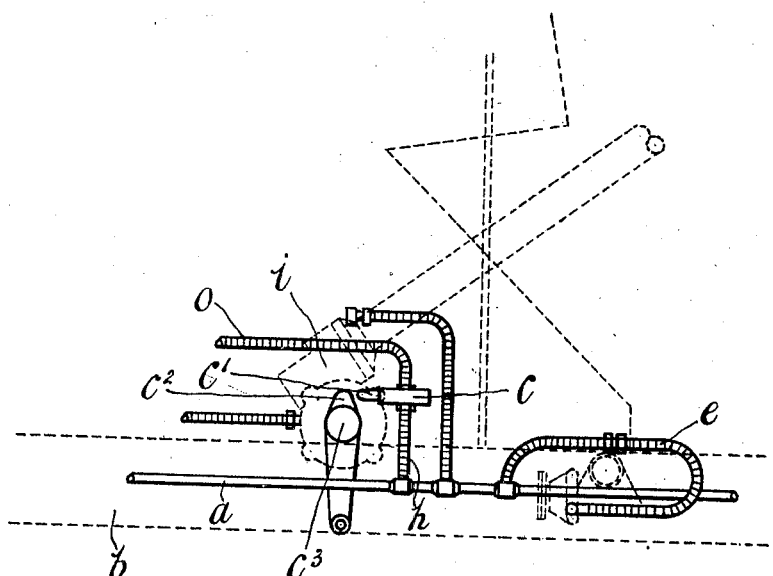
Fig: 3.
Inventor
Sydney Slater Guy
Per J. Fletcher Wilson
Attorney Patented Aug. 31, 1926.

1,598,346

UNITED STATES PATENT OFFICE.

SYDNEY SLATER GUY, OF COMPTON, NEAR WOLVERHAMPTON, ENGLAND.

LUBRICATION OF MOTOR VEHICLES.

Application filed June 16, 1923, Serial No. 645,752, and in Great Britain January 18, 1921.

This invention relates to the lubrication of motor vehicles and more particularly to the arrangement in which the chassis is provided with a system of pipe lines from which all the working parts are automatically fed with lubricant.

According to the present invention the pipe line or lines is or are kept supplied with oil by means of a valve which admits oil from a reservoir. This reservoir may be specially provided for the purpose, or the valve may be arranged to admit oil under pressure direct from the engine lubrication system. In the former case the reservoir may either be replenished by hand or may be supplied with oil from the engine lubrication pump.

The valve may be controlled by hand or foot or automatically by some necessary part of the vehicle which is used preferably not too frequently by the driver, such for example as the steering mechanism which may be arranged to open the valve when at or about full lock.

In order that the invention may be clearly understood and readily carried into practical effect reference is made in describing the same to the accompanying drawing, wherein :—

Figure 1 is a diagrammatic view of the improved chassis lubricating system as arranged according to one way of carrying out the invention.

Figures 2 and 3 are similar but shortened views of alternative arrangements.

Figure 4 is a sectional view of the front connection of the rear springs of a motor vehicle shewing the manner in which the lubricant reaches the bearing surfaces according to this invention.

Like parts are designated by similar reference characters throughout the drawing.

Referring to the arrangement shewn in Figure 1, $a$ represents one of the two pipe lines which are disposed along the inside of the channel section frame members $b$, $c$ indicates a piston-type valve of more or less ordinary construction mounted below the foot board of the vehicle with its spindle $c'$ conveniently exposed for operation by hand or foot or, as shewn, by a cam $c^2$ on the drop arm $c^3$ of the steering mechanism, and $d$ is an oil reservoir or container which in this case is specially provided for the purpose and may conveniently be arranged in the upper part of the dashboard or in any other position that will admit of its being readily accessible for the purpose of replenishment by hand on removal of the filler cap $d'$.

The various bearings and other working parts comprising the mechanism of the chassis including the springs are each connected with one or other of the pipe lines $a$ by means of branch connections $e$ which are preferably of a flexible nature and of which for the sake of clearness a few only are shewn.

For convenience of operation the valve is of the type in which the spindle $c'$ is normally maintained in its closed or inoperative postion by means of a spring. The valve is supplied with oil from the reservoir $d$ by means of a pipe $f$.

The delivery end of the valve may either be connected by a pipe $h$ direct with one of the pipe lines $a$, in which case a cross connection must be made between the two lines, or the valve may discharge into a transversely disposed pipe communicating at its ends with both pipe lines.

Provision is preferably made so that any excess of oil admitted to the pipe lines may find its way into the engine crank case. In the particular arrangement shewn in Figure 1 the unused oil from the pipe lines $a$ delivers into the steering gear box $i$ from which a return or overflow pipe $k$ conducts the excess of oil to the engine crank case.

By means of a lubrication installation constructed and arranged as above described it will be seen that the driver of the vehicle is able so long as the reservoir $d$ is kept charged to keep all the working parts adequately lubricated by periodically operating the valve $c$.

With a view to avoid the necessity even of having to recharge the reservoir $d$ by hand, the arrangement illustrated in Figure 2 may be employed. In this case the reservoir $d$, which as before may be placed on the dashboard or in any other suitable position, is automatically kept charged with oil from the usual engine lubrication pump from which a pipe $l$ runs to the upper part of the reservoir. Excess of oil is returned from the reservoir to the engine crank case by a pipe $m$ which projects to a suitable height inside the reservoir and controls the level therein. To avoid air lock the reservoir is also fitted with a vent pipe $n$.

The necessity however for the employment of a special reservoir $d$ may be dispensed with and the valve $c$ arranged to supply the oil direct from the engine lubrication system, in which case, as shewn in Figure 3, a pipe $o$ runs from the valve for that purpose.

As in the arrangement shewn in Figure 1, the unused or surplus oil from the pipe lines $a$ in Figures 2 and 3 is delivered into the steering gear box $i$ whence it overflows back to the engine crank case by the pipe $k$ to be again supplied to the reservoir or direct to the valve as the case may be.

The arrangement of the cam $c^2$ with respect to the valve is such that the latter is only fully opened when the steering mechanism is at or about full lock.

In either of the above described arrangements and particularly where the pipe lines are supplied with oil under pressure by means of the engine lubrication system, the terminal ends of the branch pipes $e$ may be closed with an absorbent material such as a wick or felt pad so that the moving parts of the mechanism of the chassis only take up such amount of lubricant as they require and there is no tendency for the said parts to get flooded with oil. For example, as shown in Figure 4, the terminal end of the oil duct $r$ in the spindle $s$ with which one of the branch pipes is adapted for connection by the nipple $t$, is closed by a wick or felt pad $u$ which bears upon and conveys oil to the bearing $v$.

I claim:—

1. A system of lubrication for the purposes described comprising pipe lines adapted for arrangement about the chassis of a motor vehicle and for connection with a lubrication pump operated by the engine, a valve located in said connection between said pump and pipe lines, branch pipes from said pipe lines adapted for connection with the various working parts of the mechanism of said chassis, and means for returning surplus lubricant from said pipe lines to said pump.

2. A system of lubrication for the purposes described comprising pipe lines adapted for arrangement about the chassis of a motor vehicle, and for connection with a lubrication pump operated by the engine, a valve arranged between said pump and pipe lines and adapted for automatic operation by some part of the mechanism of the vehicle, branch pipes from said pipe lines adapted for connection with the various working parts of the mechanism of the chassis, and means for returning surplus lubricant from said pipe lines to said pump.

3. A system of lubrication for the purposes described comprising a source of supply of lubricant elevated above the highest point of the chassis to be lubricated and adapted for automatic replenishment from some existing lubrication system on the vehicle, pipe lines connected with said source of supply and adapted for arrangement about said chassis, a valve arranged between said source of supply and said pipe lines, means operated from some part of said vehicle for automatically opening said valve so as to establish temporary communication between the pipe lines and said source of supply, branch pipes from said pipe lines for connection with the various working parts of the mechanism of said chassis, absorbent material arranged between the end of each branch pipe and the surfaces of the working parts lubricated therefrom and means for disposing of surplus lubricant from such system.

SYDNEY SLATER GUY.